(12) United States Patent
Fidan et al.

(10) Patent No.: US 10,364,515 B2
(45) Date of Patent: Jul. 30, 2019

(54) HIGH MODULUS NYLON 6.6 CORDS

(71) Applicant: KORDSA TEKNIK TEKSTIL ANONIM SIRKETI, Kocaeli (TR)

(72) Inventors: M. Saadettin Fidan, Kocaeli (TR); Yücel Ayyildiz, Kocaeli (TR); Basak Kanya, Kocaeli (TR)

(73) Assignee: KORDSA TEKNIK TEKSTIL ANONIM SIRKETI, Kocaeli (TR)

( * ) Notice: Subject to any disclaimer, the term of this patent is extended or adjusted under 35 U.S.C. 154(b) by 7 days.

(21) Appl. No.: 15/740,354

(22) PCT Filed: Jun. 9, 2016

(86) PCT No.: PCT/TR2016/050173
§ 371 (c)(1),
(2) Date: Dec. 28, 2017

(87) PCT Pub. No.: WO2017/213598
PCT Pub. Date: Dec. 14, 2017

(65) Prior Publication Data
US 2018/0313003 A1    Nov. 1, 2018

(51) Int. Cl.
*D02G 3/48*     (2006.01)
*D01F 6/60*     (2006.01)
*B60C 9/00*     (2006.01)

(52) U.S. Cl.
CPC ............ *D02G 3/48* (2013.01); *B60C 9/0042* (2013.01); *D01F 6/60* (2013.01); *B60C 2009/0035* (2013.01); *B60C 2009/0085* (2013.01); *B60C 2009/0092* (2013.01); *D10B 2331/02* (2013.01); *D10B 2505/022* (2013.01)

(58) Field of Classification Search
CPC ............ D02G 3/48; D02G 3/442; D02G 3/40; D02G 3/446; B60C 9/00; B60C 9/0042; B60C 2009/0035; B60C 2009/0085; B60C 2009/0092; B60C 2009/0007; B60C 2009/0021; D01F 6/60; D01F 6/00; D10B 2331/02; D10B 2505/022; D07B 1/0606

See application file for complete search history.

(56) References Cited

U.S. PATENT DOCUMENTS

| | | | |
|---|---|---|---|
| 3,343,363 A | | 9/1967 | Stow, Jr. et al. |
| 3,496,985 A | * | 2/1970 | Werner ............... B60C 9/0042 152/451 |
| 3,564,835 A | * | 2/1971 | Keefe, Jr. et al. ........ D01F 6/60 264/290.5 |
| 3,610,311 A | * | 10/1971 | Simons ............... B29D 30/40 152/451 |
| 3,672,423 A | * | 6/1972 | Duduk ............... B60C 9/0042 152/556 |
| 3,849,976 A | | 11/1974 | Kenyon |
| 3,921,691 A | * | 11/1975 | Kenyon ............... B60C 9/0042 152/458 |
| 4,284,117 A | | 8/1981 | Poque |
| 4,623,011 A | | 11/1986 | Kanuma |
| 5,115,853 A | | 5/1992 | Oare et al. |
| 5,240,667 A | | 8/1993 | Andrews, Jr. |
| 6,156,426 A | * | 12/2000 | Lang ............... D02G 1/168 428/364 |
| 10,214,838 B2 | * | 2/2019 | Fidan ............... B60C 9/0042 |

FOREIGN PATENT DOCUMENTS

JP    3180524 B2    6/2001
JP    2001279525 A    10/2001

OTHER PUBLICATIONS

Ayse Aytac et al. "Effect of Twist Level on Tyre Cord Performance", Fibers and Polymers, vol. 10, No. 02, Apr. 1, 2009.

* cited by examiner

Primary Examiner — Ismael Izaguirre
(74) Attorney, Agent, or Firm — Gokalp Bayramoglu

(57) ABSTRACT

A dipped and heat-set high modulus nylon 6.6 cords having a tensile stress value between 1.2 and 2.0 cN/dtex at 4% elongation. The high modulus nylon 6.6 cords are used as reinforcement in shaped rubber composites. The minimum heat shrinkage of the cords is 4% and the maximum heat shrinkage thereof is 7%.

7 Claims, No Drawings

HIGH MODULUS NYLON 6.6 CORDS

CROSS REFERENCE TO RELATED APPLICATIONS

This application is the national phase entry of International Application No. PCT/TR2016/050173, filed on Jun. 9, 2016, the entire content of which is incorporated herein by reference.

TECHNICAL FIELD

The present invention relates to a high modulus nylon 6.6 cords as reinforcement in pneumatic tires and mechanical rubber goods.

BACKGROUND OF THE INVENTION

It is well known that nylon 6.6 yarns and cords have bi-elastic tensile properties, which means low initial modulus and higher final modulus. The low initial modulus makes the tire lifting/expansion process possible without any distortions in green tire, and high final modulus (modulus after transition point from low to high modulus) improves high speed durability as cap ply in pneumatic radial tires (PCR and LT).

In U.S. Pat. No. 3,343,363 single twisted nylon 6.6 strands/yarns and cords having initial modulus of between 25 and 60 g/d and tenacity higher than 7.0 g/d at room temperature have been disclosed as tire reinforcements. The initial modulus values are determined according to ASTM A1380-61T.

In U.S. Pat. No. 3,849,976 high modulus nylon 6.6 single-ply, two-ply and three-ply cords having L5 Modulus higher than 60 g/d obtained by applying high stretch at high temperature during hot stretching process have been disclosed as tire reinforcement.

In U.S. Pat. No. 4,284,117 single twisted nylon, polyester, rayon and aramid yarns are disclosed as cap ply reinforcements in pneumatic radial tires.

According to U.S. Pat. No. 5,115,853 disclosed 420d×2 (470 dtex/2) nylon cord having less than 276 tpm cord twist, as cap ply reinforcement in radial pneumatic tires.

In order to obtain the high modulus cords, the existing regular nylon 6.6 yarns having regular modulus (tensile stress level less than 1.25 cN/dtex at 4% elongation, or tensile modulus level at 4% elongation less than 31.25 cN/dtex or 35.4 g/d) have been used. Those cords prepared from the regular modulus yarns had very high stiffness and lower bending fatigue resistance due to excessive stretching at high temperatures.

SUMMARY OF THE INVENTION

The objective of the present invention is to produce high modulus two and three-ply cords as tire reinforcement.

As can be seen in patent literature, initial modulus or LASE (Load At Specified Elongation) values of nylon cords can be increased by applying high stretches at high temperatures. In order to obtain stable(non-reversible) properties, which are maintained to a large extent even after in relaxed state (conditioned with free cut ends under lab conditions), it was necessary to expose the nylon 6.6 yarns or cords to a temperature higher than 250° C. Under those conditions conditions (high stretching under high temperature), yarns and cords become more rigid, and they lose partially their bending and compression fatigue resistance.

According to the invention, nylon 6.6 cords are stretched higher than 5% and less than 12% at a temperature range of 230-250° C. and wound up on bobbins or spools with a winding tension between 150 g and 500 g per cord. The same conditions are also valid for tire cord fabrics as roll.

DETAILED DESCRIPTION OF THE INVENTION

According to invention, in order to produce the high modulus cords, the high modulus raw nylon 6.6 yarns are used instead of regular lower modulus raw nylon 6.6 yarns which resulted in improved fatigue resistance.

The tensile stress value at 4% of the said raw nylon 6.6 yarns is greater than 1.30 cN/dtex, preferably between 1.35 and 1.60 cN/dtex (determined with tensile tester according to ASTM D885-16)

The high stretched cords having high modulus maintain their properties in bobbins, because they are not permitted to relax, and they are used in tire without experiencing significant relaxation (modulus drop).

The high modulus cords in high stretched cord fabrics also maintain their properties in rolls, because they are not permitted to relax, and they are used in tire without experiencing significant relaxation (modulus drop).

The tensile properties of the high modulus nylon 6.6 cords are determined after 24 hours conditioning on spool (without unwinding) under winding tension at 24° C. and with 55% relative humidity (ASTM D885-16). After conditioning, the cords are tested within 1 minutes after unwinding from the spool.

In case of cord fabrics, the test tabbies are conditioned as tabby (without separating and cutting out the cords from tabby as fabric) under the same conditions as mentioned above. After conditioning, the cords cut out from the tabbies are tested within 1 minutes.

The two and three-ply cords according to the invention have a stress at 4% elongation of 1.2 cN/dtex(30.6 g/dtex and 34 g/d modulus) to 2.0 cN/dtex(51 g/dtex and 56.7 g/d modulus) and thermal shrinkage at 177° C. of 4.0% to 7.0%.

The stress at 4% elongation is determined according to the following formula:

$$\text{Stress at 4\% elongation(cN/dtex)} = \text{Tension at 4\% elongation(cN)}/\text{linear density(dtex)}$$

The total nominal dtex of the cord is taken as linear density (e.g. 1400 dtex for 700 dtex/2 cord construction).

The modulus values are calculated by multiplying the stress values at 4% elongation with 25 in order to find the needed stress value for 100% elongation.

The thermal shrinkage of yarns and cords are determined with a Testrite heat shrinkage tester under a pretension of 0.045 g/dtex at 177° C. with 2 minutes exposure time.

According to invention, the heat shrinkage of the cords are within the limits of 4% and 7%, preferably 5.0% and 6.5%.

According to invention, the total nominal dtex of the cords can change between 300 and 4000 dtex.

According to invention, in order to have optimum restraining force and bending fatigue resistance, the twist factors of the cord are adjusted between 100 and 250, preferably 120 and 180 according to the following formula;

$$\text{Twist factor} = (t/m \times \text{SQRT}(tex/1000)$$

The high modulus nylon 6.6 cords can be used as reinforcement in pneumatic tires and mechanical rubber goods.

Definitions:

Dtex: The gramm weight of yarn having 10.000 meter length.

Denier: The gramm weight of yarn having 9.000 meter length g/d: Gramm/denier g/dtex: gramm/dtex Linear density: Weight per unit length as g/dtex or g/d (denier)

Modulus at 4% elongation: (Stress at 4% elongation)×25 as g/d or g/dtex

L5 Modulus: Modulus at 5% elongation, (stress at 5% elongation)×20 as g/d or g/dtex Tenacity: Breaking force/total linear density(g/dtex)

Twist: Twist per meter(t/m or tpm)

What is claimed is:

1. A two or three-ply dipped and heat-set polyamide 6.6 cord comprising: a plurality of polyamide 6.6 raw yarns;
wherein the plurality of polyamide 6.6 raw yarns have a tensile stress value greater than 1.30 cN/dtex;
wherein a stress value at 4% elongation of the polyamide 6.6 cord is higher than 1.2 cN/dtex and less than 2.0 cN/dtex,
wherein a heat shrinkage of the polyamide 6.6 cord is higher than 4.0% and less than 7.0% determined at 177° C. under 0.045 g/dtex pretension with 2 minutes exposure time;
wherein the tensile stress value is determined with a tensile tester according to ASTM D885-16.

2. The polyamide 6.6 cord of claim 1, wherein a stress value at 4% elongation of the raw yarn is preferably higher than 1.35 cN/dtex and less than 1.50 cN/dtex.

3. The polyamide 6.6 cord of claim 1, wherein the heat shrinkage of the polyamide 6.6 cord is preferably 5.0 to 6.5%.

4. The polyamide 6.6 cord of claim 1, wherein a total cord dtex of the polyamide 6.6 cord in is 300 dtex to maximum 4000 dtex.

5. The polyamide 6.6 cord of claim 1, wherein a twist factor of the polyamide 6.6 cord is 100 to 250; wherein the twist factor is calculated according to a following formula of:

$$\text{twist factor}=(t/m \times \text{SQRT}(tex/1000)).$$

6. The polyamide 6.6 cord of claim 1, wherein the tensile stress value of the plurality of polyamide 6.6 raw yarns is preferably between 1.35 and 1.60 cN/dtex at 4% elongation;
wherein the tensile stress value is determined with a tensile tester according to ASTM D885-16.

7. The polyamide 6.6 cord of claim 1, wherein the twist factor of the polyamide 6.6 cord is preferably between 120 and 180;
wherein the twist factor is calculated according to the following formula:

$$\text{twist factor}=(t/m \times \text{SQRT}(tex/1000)).$$

* * * * *